Jan. 24, 1967 A. J. CARPENTER ETAL 3,299,571
CLOSURE OPERATOR
Filed March 12, 1965

INVENTORS
Arthur J. Carpenter
BY & Vincent D. Kaptur, Jr.
W.S. Pettigrew
ATTORNEY United States Patent Office 3,299,571
Patented Jan. 24, 1967

3,299,571
CLOSURE OPERATOR
Arthur J. Carpenter, Royal Oak, and Vincent D. Kaptur, Jr., Bloomfield Hills, Mich., assignors to General Motors Corporation, Detroit, Mich., a corporation of Delaware
Filed Mar. 12, 1965, Ser. No. 439,371
4 Claims. (Cl. 49—31)

This invention relates to closure operators and more particularly to power operators for vehicle body closures.

One feature of this invention is that it provides a new and improved vehicle body closure operator. Another feature of this invention is that it provides a vehicle body closure power operator which is operative to move the closure between a plurality of selected positions and which is further operative to move the closure from any selected one of its positions to a predetermined position in response to the existence of a prescribed body condition. A further feature of this invention is that the power operator includes means for automatically returning the closure to its original selected position when the prescribed body condition ceases to exist. Another feature of this invention is that it provides a power operated regulator mechanism for a vehicle body window responsive to opening movement of some adjacent body closure to automatically move the window to the closed or other predetermined position thereof wherein the window eliminates whatever body protrusions that otherwise might be created by the open condition of the adjacent closure, and being further operable to automatically return the window to its original selected position when the adjacent closure is moved to closed position.

These and other features and advantages of the invention will be readily apparent from the following specification and drawings wherein.

Figure 1:
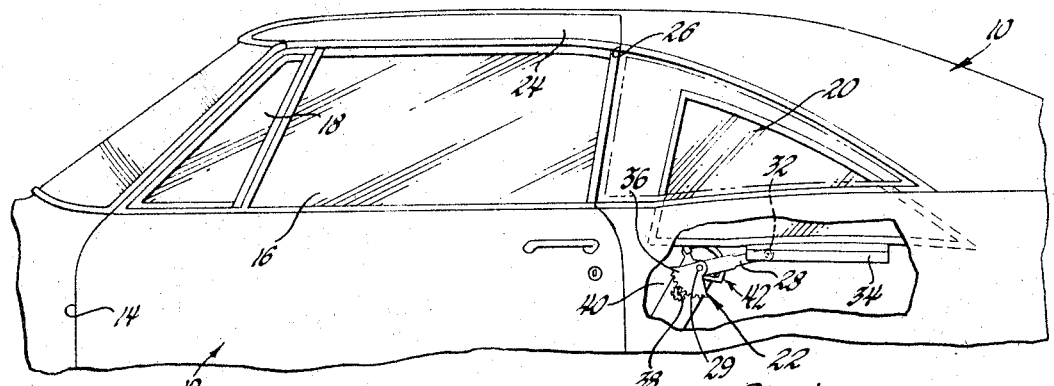
FIGURE 1 is a fragmentary elevational view of a vehicle body including a closure operator according to this invention.

Referring now particularly to FIGURE 1 of the drawings, a vehicle body 10 generally of the hardtop coupe style includes a door 12 hinged adjacent its forward edge 14 for movement between a closed position as shown and an open position, not shown. Door 12 is provided with a main window 16 movable between a raised position as shown and a lowered position within the door, and a ventilation window 18 rotatable about a generally vertical axis between open and close positions. A rear window 20 is mounted in well-known manner in conventional guide track structures, not shown, for movement between raised and lowered positions by a power operated window regulator mechanism 22.

A door opening flipper panel 24 is rotatably mounted about an axis disposed generally longitudinally of the body for movement between a lowered or closed position as shown, wherein the flipper lies contiguous with the surrounding roof area of the body, and a raised position, not shown. Flipper 24 is conventionally actuated to open and close concurrently with opening and closing movement respectively of door 12, whereby in the open position of the door, greatly increased door opening height is provided to facilitate passenger ingress and exit.

Depending upon the design of a particular flipper panel, it is possible that the raising of the flipper while rear window 20 is in a lowered position could create protrusions or corners in the roof such as that indicated at 26. To eliminate such protrusion while the flipper is open, rear window 20 can be moved to the fully raised position shown in broken lines in FIGURE 2 with the opening of the flipper. Therefore, this invention, among its other features, provides a window regulator system operative to automatically move the rear window to fully raised position when door 12 and flipper 24 are moved to open position.

Figure 2:
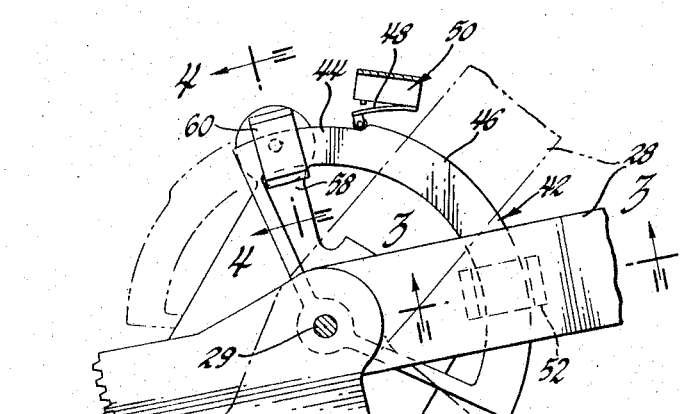
FIGURE 2 is an enlarged sectional view of a portion of FIGURE 1.

Referring now to both FIGURES 1 and 2, regulator mechanism 22 generally includes a lift arm 28 rotatably mounted intermediate its ends at 29 on a back plate 30 located intermediate the inner and outer rear quarter panels of the body. The lift arm at its upper end carries a guide roller 32 received within a guide channel 34 which cooperate to move window 20 between its positions in response to rotation of lift arm 28. Fixedly secured to the lower end of lift arm 28 is a sector gear 36 meshingly engaged with the output pinion 38 of a reversible electric motor 40 which is also suitably mounted to back plate 30.

Figure 3:
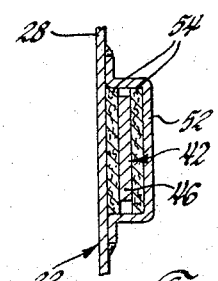
FIGURE 3 is an enlarged sectional view taken generally along the plane indicated by line 3—3 of FIGURE 2.

Disposed intermediate lift arm 28 and back plate 30 is an arcuate cam control member 42 rotatably mounted on the back plate coaxially with lift arm 28 at pivot 29. Cam 42 includes a curved part having a reduced height portion 44 and an increased height portion 46 both adapted to be engaged at their edges by a roller of a leaf contact 48 of a memory switch 50 which is mounted in fixed position on the vehicle body 10. As seen best in FIGURE 3, the curved part of cam 42 is received within a generally U-shaped bracket 52 secured to the underside of lift arm 28, and a pair of friction members 54 fabricated of suitable fibrous or elastomeric material are secured to the bracket and the lift arm to grippingly engage the cam. Through the frictional contact of members 54, cam 42 seeks to rotate as a unit with the lift arm.

Figure 4:
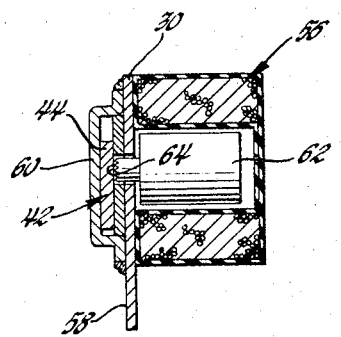
FIGURE 4 is an enlarged sectional view taken generally along the plane indicated by line 4—4 of FIGURE 2.

Referring to FIGURE 4, a cam lock solenoid 56 has the coil casing thereof suitably secured to an extension 58 of back plate 30, and a generally U-shaped bracket 60 which also receives the curved portion of cam 42 is welded to the underside of the extension opposite solenoid 56. The armature 62 of the solenoid is provided with a tip extending through an aperture in the back plate and provided with serrations or teeth 64. When solenoid 56 is energized, armature 62 thereof is displaced outwardly thereof with sufficient force to cause teeth 64 to grip the cam and hold it against the unitary movement with lift arm 28 that would otherwise arise from the frictional contact to members 54. The contact of members 54 is of course adjusted so as not to overcome the grip of teeth 64 when solenoid 56 is energized, but yet carry the cam when the solenoid is not energized.

Figure 5:
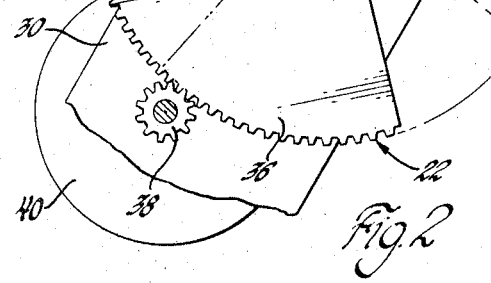
FIGURE 5 is a circuit diagram.

Referring now to FIGURE 5, the control system for window regulator 22 includes a lead 66 connecting the grounded vehicle battery 68 or other electrical power source to a double-pole, double-throw switch 70. Switch 70, through the first throw 72 thereof, is adapted to energize either the window-up or window-down windings of motor 40 for normal passenger selection of the position of window 20. Battery 68 is further connected in parallel with switch 70 through a lead 78 to a flipper-responsive switch 80. Switch 80 is suitably associated with flipper 24 so that when the flipper is in the lowered position shown, the switch closes as shown in full lines to a lead 82, and when the flipper is in raised position, the switch closes as shown in broken lines to a lead 84. Lead 82 connects with the memory switch 50 provided at regulator mechanism 22, the lead 84 connects with a rear window limit switch 86 which is closed to a lead 88 when the window is in a lowered position and open when the window is in fully raised position. Memory switch 50 connects through a lead 90 to a first relay 92, and lead 88 from switch 86 connects to a second relay 94, both of which relays are shown in nonactuated condition. When not actuated, relays 92 and 94 connect the other throw 96 of switch 70 across leads 98 and 100 to the grounded cam lock solenoid 56, so that the solenoid is normally energized from throw 96 when the passenger switch 70 actuates motor 40 for normal passenger operation of window 20 in either direction, the significance of which will later appear.

Assume now that window 20 has been located in a selected position such as that shown in full lines in FIGURES 1 and 2, and that subsequently, door 12 and flipper 24 are opened for passenger ingress or exit. Flipper switch 80 will accordingly be closed to lead 84 and limit switch 86, which is further closed to lead 88 since the window is in a lowered position, and relay 94 will then be actuated toward the leftward poles thereof. A lead 102 in parallel with the relay is thus closed through a lead 104 and lead 76 to the window-up winding of motor 40 so that the motor operates regulator mechanism 22 to move the window to fully closed position, whereupon limit switch 86 opens and stops the motor. As the passenger switch 72 is not disturbed from neutral position in these circumstances in the manner that it is during passenger operation of the window, the circuit through leads 98 and 100 to the cam lock solenoid 56 is open so that there is no energization of the solenoid causing the armature teeth 64 thereof to grip the cam 42. Thus, referring to FIGURE 2, the cam will be rotated by members 54 as a unit with lift arm 28 and window 20 to the fully closed position thereof wherein the lift arm 28 and the cam 42 assume the position shown in broken lines in FIGURE 2. During such movement, the increased height portion 46 of the cam has been rotated counterclockwise to engage the leaf contact 48 and close memory switch 50. With switch 50 closed, lead 82 is closed to lead 90 and relay 92.

Under these circuit conditions, once the desired passenger exit or ingress has been accomplished and the door 12 and flipper 24 are subsequently closed, switch 80 will accordingly be moved by the flipper to the full-line position closing lead 78 to lead 82. Relay 92 is thus actuated toward the leftward poles thereof, relay 94 having been deactuated by the opening of switch 86 and the movement of switch 80. A lead 106 in parallel with relay 92 is closed by the relay to a lead 108 and to the lead 74 to the window-down winding of motor 40, and the motor causes the regulator mechanism 22 to move window 20 toward a lowered position. Again, with the passenger switch 72 remaining in neutral position, cam lock solenoid 56 remains deenergized and the cam 42 thus moves with lift arm 28 clockwise from the broken-line position shown in FIGURE 2. Since the relative position of the cam and lift arm have remained undisturbed during the automatic movement of the window to fully raised position, regulator mechanism 22 will continue to lower the window until the lift arm and the cam reach the initial selected position. At this point, leaf contact 48 enters the reduced height portion of the cam and memory switch 50 is opened. With switch 50 opened, relay 92 is deactuated, motor 40 is stopped, the circuit assumes its original condition, and window 20 has been located in the original selected position thereof.

It will be observed that if the window 20 was originally selected to be in the fully raised position, limit switch 86 is open so that the automatic movement and memory return sequences do not obtain.

Thus a new and improved closure operator is provided. We claim:

1. In a vehicle body, the combination comprising, means defining a first opening in said body, a first closure for said first opening movable between first and second positions relative thereto, means defining a second opening in said body adjacent said first opening, a second closure for said second opening movable relative thereto between a plurality of selected positions and a predetermined position, a source of power, power operated means for moving said second closure, first control means for connecting said power operated means across said source of power for moving said second closure from any one of said plurality of selected positions to any other selected position thereof, second control means responsive to movement of said first closure from the first to the second position thereof for connecting said power operated means across said source of power to move said second closure from said other selected position thereof to said predetermined position thereof, memory control means connected with said source of power and operative to cause said power operated means to return said second closure from said predetermined to said other selected position thereof, and means responsive to movement of said first closure from the second to the first position thereof to cause said memory control means to connect said power operated means across said source of power to return said second closure from said predetermined to said other selected position thereof.

2. The combination recited in claim 1 wherein said memory control means includes stationary control means actuable between energizing and non-energizing conditions, and further control means movable relative to said stationary control means for actuation thereof and between a first nonactuating position obtaining when said second closure is in said other selected position thereof and an actuating position obtaining in the predetermined position thereof, and means operable to move said further control means between said positions thereof upon operation of said power operated means by said second control means moving said second closure from said other selected position thereof to said predetermined position thereof.

3. The combination recited in claim 2 wherein said power operated means includes a driven member operatively connected to said closure, wherein said stationary control means includes a switch, and wherein said further control means includes a switch actuating member normally movable with said driven member in a path to be engageable with said switch for actuation thereof and means preventing movement of said actuating member with said driven member when said power operated means is energized by said first control means.

4. The combination recited in claim 3, including friction means interconnecting said driven member and said actuating member for movement thereof normally as a unit, said preventing means including further power operated means connectible across said source of power by said first control means coincidentally with the first mentioned power operated means, said further power operated means being operable when energized to overcome said friction means and hold said actuating member against movement as a unit with said driven member.

References Cited by the Examiner

UNITED STATES PATENTS

| | | | |
|---|---|---|---|
| 2,973,221 | 2/1961 | Blackman | 268—74 X |
| 3,024,062 | 3/1962 | Himka et al. | 268—16 X |
| 3,169,329 | 2/1965 | Powers | 268—62 X |

HARRISON R. MOSELEY, *Primary Examiner.*

J. K. BELL, *Assistant Examiner.*